(12) United States Patent
Liu et al.

(10) Patent No.: US 8,248,379 B2
(45) Date of Patent: Aug. 21, 2012

(54) TOUCH PANEL, METHOD FOR MAKING THE SAME, AND DISPLAY DEVICE ADOPTING THE SAME

(75) Inventors: Chang-Hong Liu, Beijing (CN); Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 953 days.

(21) Appl. No.: 12/286,155

(22) Filed: Sep. 29, 2008

(65) Prior Publication Data
US 2009/0153506 A1 Jun. 18, 2009

(30) Foreign Application Priority Data
Dec. 14, 2007 (CN) .......................... 2007 1 0125116

(51) Int. Cl.
*G06F 3/041* (2006.01)
(52) U.S. Cl. ...................................................... 345/173
(58) Field of Classification Search .................. 345/173, 345/174; 313/497, 310, 311, 309, 495; 381/164, 381/426; 349/123, 161, 149, 158
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |
| 7,060,241 B2 | 6/2006 | Glatkowski | |
| 7,071,927 B2 | 7/2006 | Blanchard | |

(Continued)

FOREIGN PATENT DOCUMENTS
CN 2539375 3/2003
(Continued)

OTHER PUBLICATIONS

Wu et al."Transparent, Conductive Carbon Nanotube Films". Science,vol. 305,(2004);pp. 1273-1276.

(Continued)

*Primary Examiner* — Nabil Hindi
(74) *Attorney, Agent, or Firm* — Altis Law Group, Inc.

(57) ABSTRACT

A touch panel includes a first electrode plate, and a second electrode plate separated from the first electrode plate. The first electrode plate includes a first substrate and a first conductive layer located on a lower surface of the first substrate. The second electrode plate includes a second substrate and a second conductive layer located on an upper surface of the second substrate. At least one of the first conductive layer and the second conductive layer includes a carbon nanotube structure comprised of carbon nanotubes. The carbon nanotubes in the carbon nanotube structure are arranged isotropically, arranged along a same direction or arranged along different directions.

18 Claims, 7 Drawing Sheets

U.S. PATENT DOCUMENTS

| | | |
|---|---|---|
| 7,084,933 B2 | 8/2006 | Oh et al. |
| 7,196,463 B2 | 3/2007 | Okai et al. |
| 7,215,329 B2 | 5/2007 | Yoshikawa et al. |
| 7,242,136 B2 | 7/2007 | Kim et al. |
| 7,336,261 B2 | 2/2008 | Yu |
| 7,348,966 B2 | 3/2008 | Hong et al. |
| 7,355,592 B2 | 4/2008 | Hong et al. |
| 7,532,182 B2 | 5/2009 | Tseng et al. |
| 7,593,004 B2 | 9/2009 | Spath et al. |
| 7,630,040 B2 * | 12/2009 | Liu et al. .................. 349/123 |
| 7,662,732 B2 | 2/2010 | Choi et al. |
| 7,663,607 B2 | 2/2010 | Hotelling et al. |
| 7,704,480 B2 | 4/2010 | Jiang et al. |
| 7,710,649 B2 | 5/2010 | Feng et al. |
| 7,796,123 B1 | 9/2010 | Irvin, Jr. et al. |
| 7,825,911 B2 | 11/2010 | Sano et al. |
| 7,854,992 B2 | 12/2010 | Fu et al. |
| 7,947,977 B2 | 5/2011 | Jiang et al. |
| 2002/0089492 A1 | 7/2002 | Ahn et al. |
| 2003/0122800 A1 | 7/2003 | Yu |
| 2003/0147041 A1 | 8/2003 | Oh et al. |
| 2003/0189235 A1 | 10/2003 | Watanabe et al. |
| 2004/0047038 A1 | 3/2004 | Jiang et al. |
| 2004/0053780 A1 | 3/2004 | Jiang et al. |
| 2004/0099438 A1 | 5/2004 | Arthur et al. |
| 2004/0105040 A1 | 6/2004 | Oh et al. |
| 2004/0136896 A1 | 7/2004 | Liu et al. |
| 2004/0191157 A1 | 9/2004 | Harutyunyan et al. |
| 2004/0251504 A1 | 12/2004 | Noda |
| 2005/0110720 A1 | 5/2005 | Akimoto et al. |
| 2005/0151195 A1 | 7/2005 | Kavase et al. |
| 2005/0209392 A1 | 9/2005 | Luo et al. |
| 2006/0010996 A1 | 1/2006 | Jordan et al. |
| 2006/0022221 A1 | 2/2006 | Furukawa et al. |
| 2006/0044284 A1 | 3/2006 | Tanabe |
| 2006/0077147 A1 | 4/2006 | Palmateer et al. |
| 2006/0097991 A1 | 5/2006 | Hotelling et al. |
| 2006/0171032 A1 | 8/2006 | Nishioka |
| 2006/0187213 A1 | 8/2006 | Su |
| 2006/0187369 A1 | 8/2006 | Chang |
| 2006/0188721 A1 | 8/2006 | Irvin, Jr. et al. |
| 2006/0213251 A1 | 9/2006 | Rinzler et al. |
| 2006/0240605 A1 | 10/2006 | Moon et al. |
| 2006/0262055 A1 | 11/2006 | Takahara |
| 2006/0263588 A1 | 11/2006 | Handa et al. |
| 2006/0274047 A1 | 12/2006 | Spath et al. |
| 2006/0274048 A1 | 12/2006 | Spath et al. |
| 2006/0274049 A1 | 12/2006 | Spath et al. |
| 2006/0275956 A1 | 12/2006 | Konesky |
| 2006/0278444 A1 | 12/2006 | Binstead |
| 2007/0065651 A1 | 3/2007 | Glatkowski et al. |
| 2007/0075619 A1 | 4/2007 | Jiang et al. |
| 2007/0081681 A1 | 4/2007 | Yu et al. |
| 2007/0099333 A1 | 5/2007 | Moriya |
| 2007/0165004 A1 | 7/2007 | Seelhammer et al. |
| 2007/0182720 A1 | 8/2007 | Fujii et al. |
| 2007/0215841 A1 | 9/2007 | Ford et al. |
| 2007/0257894 A1 | 11/2007 | Philipp |
| 2007/0262687 A1 | 11/2007 | Li |
| 2007/0279556 A1 | 12/2007 | Wang et al. |
| 2007/0296897 A1 | 12/2007 | Liu et al. |
| 2007/0298253 A1 | 12/2007 | Hata et al. |
| 2008/0007535 A1 | 1/2008 | Li |
| 2008/0029292 A1 | 2/2008 | Takayama et al. |
| 2008/0048996 A1 | 2/2008 | Hu et al. |
| 2008/0088219 A1 | 4/2008 | Yoon et al. |
| 2008/0095694 A1 | 4/2008 | Nakayama et al. |
| 2008/0129666 A1 | 6/2008 | Shimotono et al. |
| 2008/0138589 A1 | 6/2008 | Wakabayashi et al. |
| 2008/0192014 A1 | 8/2008 | Kent et al. |
| 2008/0238882 A1 | 10/2008 | Sivarajan et al. |
| 2008/0266273 A1 | 10/2008 | Slobodin et al. |
| 2009/0032777 A1 | 2/2009 | Kitano et al. |
| 2009/0056854 A1 | 3/2009 | Oh et al. |
| 2009/0059151 A1 | 3/2009 | Kim et al. |
| 2009/0101488 A1 | 4/2009 | Jiang et al. |
| 2009/0153511 A1 | 6/2009 | Jiang et al. |
| 2009/0153513 A1 | 6/2009 | Liu et al. |
| 2009/0153516 A1 | 6/2009 | Liu et al. |
| 2009/0167709 A1 | 7/2009 | Jiang et al. |
| 2009/0208708 A1 | 8/2009 | Wei et al. |
| 2009/0283211 A1 | 11/2009 | Matsuhira |
| 2009/0293631 A1 | 12/2009 | Radivojevic |
| 2010/0001972 A1 | 1/2010 | Jiang et al. |
| 2010/0001975 A1 | 1/2010 | Jiang et al. |
| 2010/0001976 A1 | 1/2010 | Jiang et al. |
| 2010/0007619 A1 | 1/2010 | Jiang et al. |
| 2010/0007624 A1 | 1/2010 | Jiang et al. |
| 2010/0007625 A1 | 1/2010 | Jiang et al. |
| 2010/0065788 A1 | 3/2010 | Momose et al. |
| 2010/0078067 A1 | 4/2010 | Jia et al. |
| 2010/0093247 A1 | 4/2010 | Jiang et al. |
| 2010/0171099 A1 | 7/2010 | Tombler, Jr. et al. |
| 2010/0271330 A1 | 10/2010 | Philipp |
| 2011/0032196 A1 | 2/2011 | Feng et al. |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | 62-139028 | 6/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 1995-28598 | 1/1995 |
| JP | 8-287775 | 11/1996 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |

| | | |
|---|---|---|
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2006-330883 | 12/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 1982209 | 6/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

ASM Handbook."vol. 2 Properties and Selection: Nonferrous Alloys and Special-Purpose Materials".Apr. 2007; pp. 840-853.
Susuki et al."Investigation of physical and electric properties of silver pastes as binder for thermoelectric materials". Review of Scientific Instruments,76,(2005);pp.023907-1 to 023907-5.
Fan et al. "Self-Oriented Regular Arrays of Carbon Nanotubes and Their Field Emission Properties". Science, vol. 283, (1999);pp. 512-514.
George Gruner, "Carbon Nanonets Spark New Electronics", Scientific American, pp. 76-83, May 2007.
Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).
Mei Zhang etal., "Strong Transparent, Multifunctional, Carbon Nanotube Sheets", Science, America, AAAS, vol. 309, pp. 1215-1219, Aug. 19, 2005.
Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).
Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).
Kai-Li Jiang, Qun-Qing Li, Shou-Shan Fan, "Continuous carbon nanotube yarns and their applications", Physics, China, pp. 506-510,Aug. 31,2003,32(8)(lines from the 4th line to 35th line in the right col. of p. 507 may be relevant).
Yu Xiang, Technique of Touch Panel & the Production of Resistance-type Touch Panel Insulation Dot, Journal of Longyan Teachers College, p. 25-26, vol. 22, No. 6, 2004.
R Colin Johnson, "Carbon nanotubes aim for cheap, durable touch screens",2007.08 http://psroc.phys.ntu.edu.tw/bimonth/v27/615.pdf.
Xianglin Liu, "strong, transparent, multifunctional carbon nanotube sheets", pp. 720-721, 2005.10 http://www.eettaiwan.com/articleLogin.do?artld=8800474428&fromWhere=/ART_8800474428_480502_NT_95e7014f. HTM&catld=480502&newsType=NT&pageNo=null&encode=95e7014f.

* cited by examiner

```
┌─────────────────────────────────────────────────┐
│ providing a pressing device, and pressing the array │
│ of carbon nanotubes to form a carbon nanotube film │
└─────────────────────────────────────────────────┘
                        │
                        ▼
┌─────────────────────────────────────────────────┐
│ cutting the carbon nanotube film into sizes of the │
│ first substrate and the second substrate          │
└─────────────────────────────────────────────────┘
                        │
                        ▼
┌─────────────────────────────────────────────────┐
│ adhering the cut carbon nanotube films on the first │
│ substrate and the second substrate respectively to │
│ form the first conductive layer and the second    │
│ conductive layer                                  │
└─────────────────────────────────────────────────┘
```

FIG. 4

TOUCH PANEL, METHOD FOR MAKING THE SAME, AND DISPLAY DEVICE ADOPTING THE SAME

RELATED APPLICATIONS

This application is related to commonly-assigned applications entitled, "TOUCH PANEL" filed Sep. 29, 2008 Ser. No. 12/286,266; "TOUCH PANEL" filed Sep. 29, 2008 Ser. No. 12/286,141; "TOUCH PANEL AND DISPLAY DEVICE USING THE SAME" filed Sep. 29, 2008 Ser. No. 12/286,189; "TOUCH PANEL AND DISPLAY DEVICE USING THE SAME" filed Sep. 29, 2008 Ser. No. 12/286,181; "TOUCH PANEL AND DISPLAY DEVICE USING THE SAME" filed Sep. 29, 2008 Ser. No. 12/286,176; "TOUCH PANEL AND DISPLAY DEVICE USING THE SAME" filed Sep. 29, 2008 Ser. No. 12/286,166; "TOUCH PANEL AND DISPLAY DEVICE USING THE SAME" filed Sep. 29, 2008 Ser. No. 12/286,178; "TOUCH PANEL AND DISPLAY DEVICE USING THE SAME" filed Sep. 29, 2008 Ser. No. 12/286,148; "TOUCHABLE CONTROL DEVICE" filed Sep. 29, 2008 Ser. No. 12/286,140; "TOUCH PANEL AND DISPLAY DEVICE USING THE SAME" filed Sep. 29, 2008 Ser. No. 12/286,154; "TOUCH PANEL AND DISPLAY DEVICE USING THE SAME" filed Sep. 29, 2008 Ser. No. 12/286,266; "TOUCH PANEL AND DISPLAY DEVICE USING THE SAME" filed Sep. 29, 2008 Ser. No. 12/286,146; "TOUCH PANEL AND DISPLAY DEVICE USING THE SAME" filed Sep. 29, 2008 Ser. No. 12/286,145; "TOUCH PANEL AND DISPLAY DEVICE ADOPTING THE SAME" filed Sep. 29, 2008 Ser. No. 12/286,152; "TOUCH PANEL AND DISPLAY DEVICE USING THE SAME" filed Sep. 29, 2008 Ser. No. 12/286,179; "TOUCH PANEL, METHOD FOR MAKING THE SAME, AND DISPLAY DEVICE ADOPTING THE SAME" filed Sep. 29, 2008 Ser. No. 12/286,228; "TOUCH PANEL AND DISPLAY DEVICE USING THE SAME" filed Sep. 29, 2008 Ser. No. 12/286,153; "TOUCH PANEL AND DISPLAY DEVICE USING THE SAME" filed Sep. 29, 2008 Ser. No. 12/286,184; "METHOD FOR MAKING TOUCH PANEL" filed Sep. 29, 2008 Ser. No. 12/286,175; "METHOD FOR MAKING TOUCH PANEL" filed Sep. 29, 2008 Ser. No. 12/286,195; "TOUCH PANEL AND DISPLAY DEVICE USING THE SAME" filed Sep. 29, 2008 Ser. No. 12/286,160; "TOUCH PANEL AND DISPLAY DEVICE USING THE SAME" filed Sep. 29, 2008 Ser. No. 12/286,220; "TOUCH PANEL AND DISPLAY DEVICE USING THE SAME" filed Sep. 29, 2008 Ser. No. 12/286,227; "TOUCH PANEL AND DISPLAY DEVICE USING THE SAME" filed Sep. 29, 2008 Ser. No. 12/286,144; "TOUCH PANEL AND DISPLAY DEVICE USING THE SAME" filed Sep. 29, 2008 Ser. No. 12/286,218; "TOUCH PANEL AND DISPLAY DEVICE USING THE SAME" filed Sep. 29, 2008 Ser. No. 12/286,142; "TOUCH PANEL AND DISPLAY DEVICE USING THE SAME" filed Sep. 29, 2008 Ser. No. 12/286,641; "TOUCH PANEL, METHOD FOR MAKING THE SAME, AND DISPLAY DEVICE ADOPTING THE SAME", filed Sep. 29, 2008 Ser. No. 12/286,151; "ELECTRONIC ELEMENT HAVING CARBON NANOTUBES" filed Sep. 29, 2008 Ser. No. 12/286,143; and "TOUCH PANEL, METHOD FOR MAKING THE SAME, AND DISPLAY DEVICE ADOPTING THE SAME" filed Sep. 29, 2008 Ser. No. 12/286,219. The disclosures of the above-identified applications are incorporated herein by reference.

BACKGROUND

1. Field of the Invention

The present invention relates to a carbon nanotube based touch panel, a method for making such touch panel, and a display device adopting such touch panel.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels in front of their respective display devices (e.g., liquid crystal panels). A user of any such electronic apparatus operates it by pressing or touching the touch panel with a finger, a pen, stylus, or a like tool while visually observing the display device through the touch panel. A demand thus exists for such touch panels that are superior in visibility and reliable in operation.

At present, different types of touch panels, including a resistance-type, a capacitance-type, an infrared-type, and a surface sound wave-type, have been developed. Due to the high accuracy and low cost of production of the resistance-type touch panel, this touch panel has become widely used.

A conventional resistance-type touch panel includes an upper substrate, an optically transparent upper conductive layer formed on a lower surface of the upper substrate, a lower substrate, an optically transparent lower conductive layer formed on an upper surface of the lower substrate, and a plurality of dot spacers formed between the optically transparent upper conductive layer and the optically transparent lower conductive layer. The optically transparent upper conductive layer and the optically transparent lower conductive layer are formed of conductive indium tin oxide (ITO).

In operation, an upper surface of the upper substrate is pressed with a finger, a pen, or a like tool, and visual observation of a screen on the liquid crystal display device provided on a back side of the touch panel is provided. The pressing causes the upper substrate to be deformed, and the upper conductive layer thus comes in contact with the lower conductive layer at the position where the pressing occurs. Voltages are applied successively from an electronic circuit to the optically transparent upper conductive layer and the optically transparent lower conductive layer. Thus, the position of the deformation can be detected by the electronic circuit.

The optically transparent conductive layer (e.g., ITO layer) is generally formed by means of ion-beam sputtering, and this method is relatively complicated. Additionally, the ITO layer has poor wearability/durability, low chemical endurance, and uneven resistance over an entire area of the touch panel. Furthermore, the ITO layer has relatively low transparency. All the above-mentioned problems of the ITO layer makes for a touch panel with somewhat low sensitivity, accuracy, and brightness.

What is needed, therefore, is to provide a durable touch panel with high sensitivity, accuracy, and brightness, a method for making such touch panel, and a display device using the touch panel.

SUMMARY

In one embodiment, a touch panel includes a first electrode plate, and a second electrode plate separated from the first electrode plate. The first electrode plate includes a first substrate and a first conductive layer located on a lower surface of the first substrate. The second electrode plate includes a second substrate and a second conductive layer located on an upper surface of the second substrate. At least one of the first conductive layer and the second conductive layer includes a carbon nanotube structure comprised of carbon nanotubes. The carbon nanotubes in the carbon nanotube structure are arranged isotropically, arranged along a same direction or arranged along different directions.

Other novel features and advantages will become more apparent from the following detailed description of preferred and exemplary embodiments when taken in conjunction with the accompanying drawings.

BRIEF DESCRIPTION OF THE DRAWINGS

Many aspects of the present touch panel, method for making the same, and display device adopting the same can be better understood with reference to the following drawings. The components in the drawings are not necessarily to scale, the emphasis instead being placed upon clearly illustrating the principles of the present touch panel, method for making the same, and display device adopting the same. In the drawings, all the views are schematic.

FIG. 4 is a flow chart of an exemplary method for making a first conductive layer and a second conductive layer of the exemplary embodiment.

Figure 1:
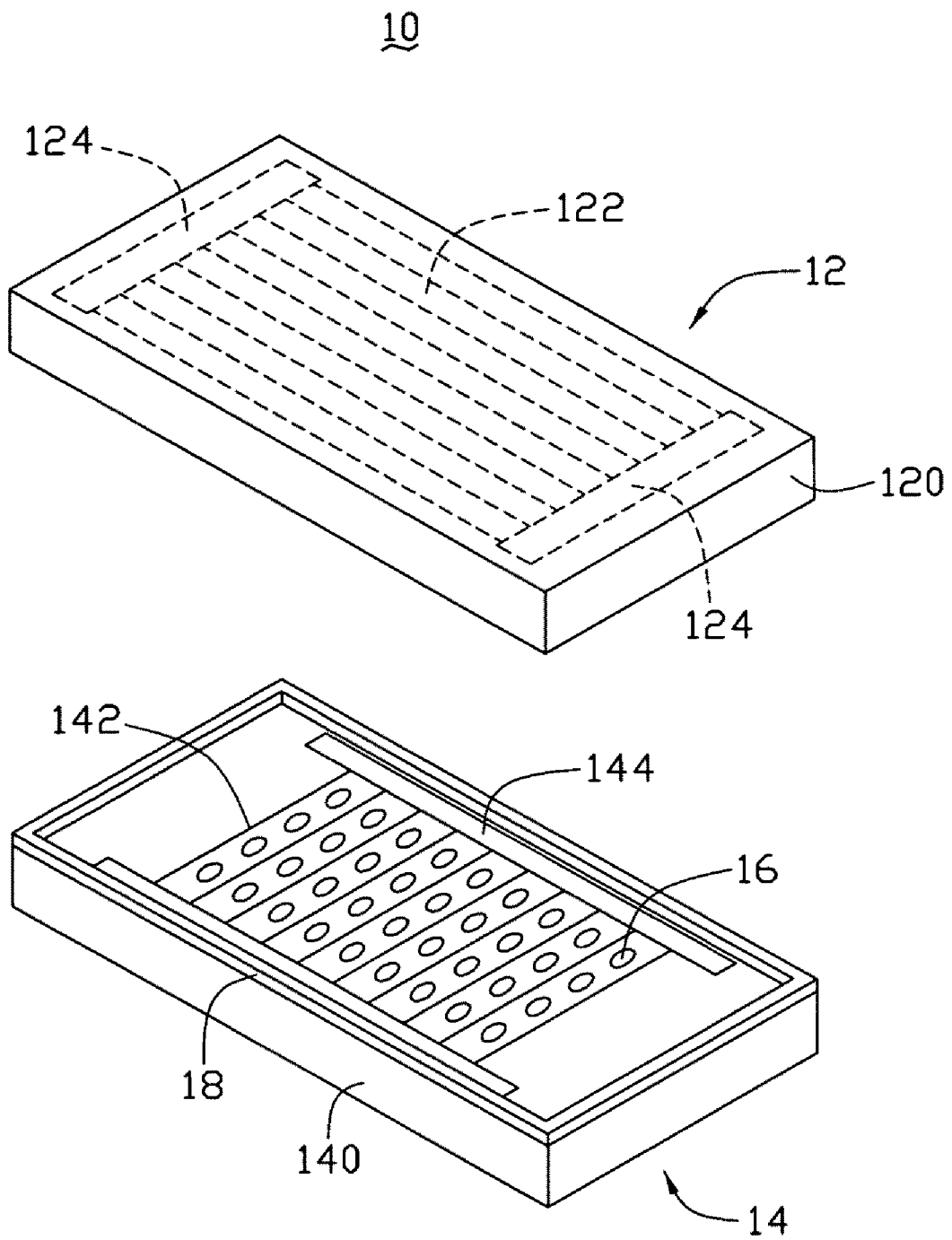
FIG. 1 is an exploded, isometric view of two electrode plates of a touch panel in accordance with an exemplary embodiment of the present invention, showing an upper one of the electrode plates inverted.

Corresponding reference characters indicate corresponding parts throughout the several views. The exemplifications set out herein illustrate at least one embodiment of the present touch panel, method for making the same, and display device adopting the same, in at least one form, and such exemplifications are not to be construed as limiting the scope of the invention in any manner.

DETAILED DESCRIPTION OF EMBODIMENTS

Reference will now be made to the drawings to describe, in detail, embodiments of the present touch panel, method for making the same, and display device adopting the same.

Figure 2:
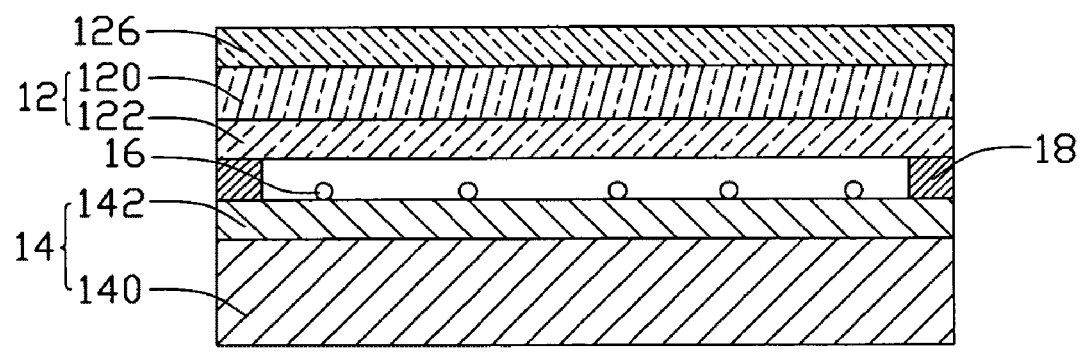
FIG. 2 is a side, cross-sectional view of the touch panel of the exemplary embodiment once assembled.

Referring to FIG. 1 and FIG. 2, a touch panel 10 includes a first electrode plate 12, a second electrode plate 14, and a plurality of dot spacers 16 located between the first electrode plate 12 and the second electrode plate 14.

The first electrode plate 12 includes a first substrate 120, a first conductive layer 122, and two first-electrodes 124. The first substrate 120 includes an upper surface and a lower surface. The two first-electrodes 124 and the first conductive layer 122 are located on the lower surface of the first substrate 120. The two first-electrodes 124 are located separately on opposite ends of the first conductive layer 122. A direction from one of the first-electrodes 124 across the first conductive layer 122 to the other first-electrode 124 is defined as a first direction. The two first-electrodes 124 are electrically connected with the first conductive layer 122.

The second electrode plate 14 includes a second substrate 140, a second conductive layer 142, and two second-electrodes 144. The second substrate 140 includes an upper surface and a lower surface, each of which is substantially flat. The two second-electrodes 144 and the second conductive layer 142 are located on the upper surface of the second substrate 140. The two second-electrodes 144 are located separately on opposite sides of the second conductive layer 142. A direction from one of the second-electrodes 144 across the second conductive layer 142 to the other second-electrode 144 is defined as a second direction. The two second-electrodes 144 are electrically connected with the second conductive layer 142.

The first direction is perpendicular to the second direction. That is, the two first-electrodes 124 are aligned parallel to the second direction, and the two second-electrodes 144 are aligned parallel to the first direction. The first substrate 120 is a transparent and flexible film or plate. The second substrate 140 is a transparent plate. The first-electrodes 124 and the second-electrodes 144 are made of metal or any other suitable material. In the present embodiment, the first substrate 120 is a polyester film, the second substrate 140 is a glass plate, and the first-electrodes 124 and second-electrodes 144 are made of a conductive silver paste.

An insulative frame 18 is provided between the first and second electrode plates 12, 14. The first electrode plate 12 is located on the insulative frame 18. The first conductive layer 122 is opposite to, but is spaced from, the second conductive layer 142. The dot spacers 16 are separately located on the second conductive layer 142. A distance between the second electrode plate 14 and the first electrode plate 12 is in an approximate range from 2 to 20 microns. The insulative frame 18 and the dot spacers 16 are made of, for example, insulative resin or any other suitable insulative material. Insulation between the first electrode plate 12 and the second electrode plate 14 is provided by the insulative frame 18 and the dot spacers 16. It is to be understood that the dot spacers 16 are optional, particularly when the touch panel 10 is relatively small. The dot spacers 16 serve as supports having regard to the size, span, and strength of the first electrode plate 12.

At least one of the first conductive layer 122 and the second conductive layer 142 includes a carbon nanotube layer. The carbon nanotubes in the carbon nanotube structure are arranged isotropically, arranged along a same direction or arranged along different directions. An angle between a primary alignment direction of the carbon nanotubes in the carbon nanotube structure and the carbon nanotube structure is 0° to approximately 15° when measured from the surface of the carbon nanotube structure. The carbon nanotube structure can be formed by pressing a carbon nanotube array. The angle is closely related to pressure applied to the carbon nanotube array. The greater the pressure, the smaller the angle. The carbon nanotubes in the carbon nanotube structure can parallel to the surface of the carbon nanotube structure when the angle is 0°. The carbon nanotube structure can be a transparent carbon nanotube film. A length and a width of the carbon nanotube film can be arbitrarily set as desired. A thickness of the carbon nanotube structure is in an approximate range from 0.5 nanometers to 100 micrometers.

In one suitable embodiment, the first conductive layer 122 and the second conductive layer 142 each include, at a minimum, one carbon nanotube layer. In this embodiment, the carbon nanotube structure includes a single carbon nanotube film. The carbon nanotube film includes a plurality of carbon nanotubes isotropically arranged, or arranged either along a same direction or along different directions. In one embodiment, the carbon nanotubes in the carbon nanotube film are parallel to the surface of the carbon nanotube film. In one suitable embodiment, the carbon nanotubes in the first conductive layer 122 are arranged along the first direction, and the carbon nanotubes in the second conductive layer 142 are arranged along the second direction. In another embodiment, the carbon nanotubes in the first conductive layer 122 are arranged along a direction oblique to a direction along which the carbon nanotubes in the second conductive layer 142 are arranged.

In one suitable embodiment, a transparent protective film 126 can be further located on the upper surface of the first electrode plate 12. The material of the transparent protective film 126 can be selected from a group consisting of silicon nitride, silicon dioxide, benzocyclobutene, polyester film, and polyethylene terephthalate. The transparent protective film 126 can, rather appropriately, be a slick plastic film and receive a surface hardening treatment to protect the first electrode plate 12 from being scratched when in use.

Figure 7:
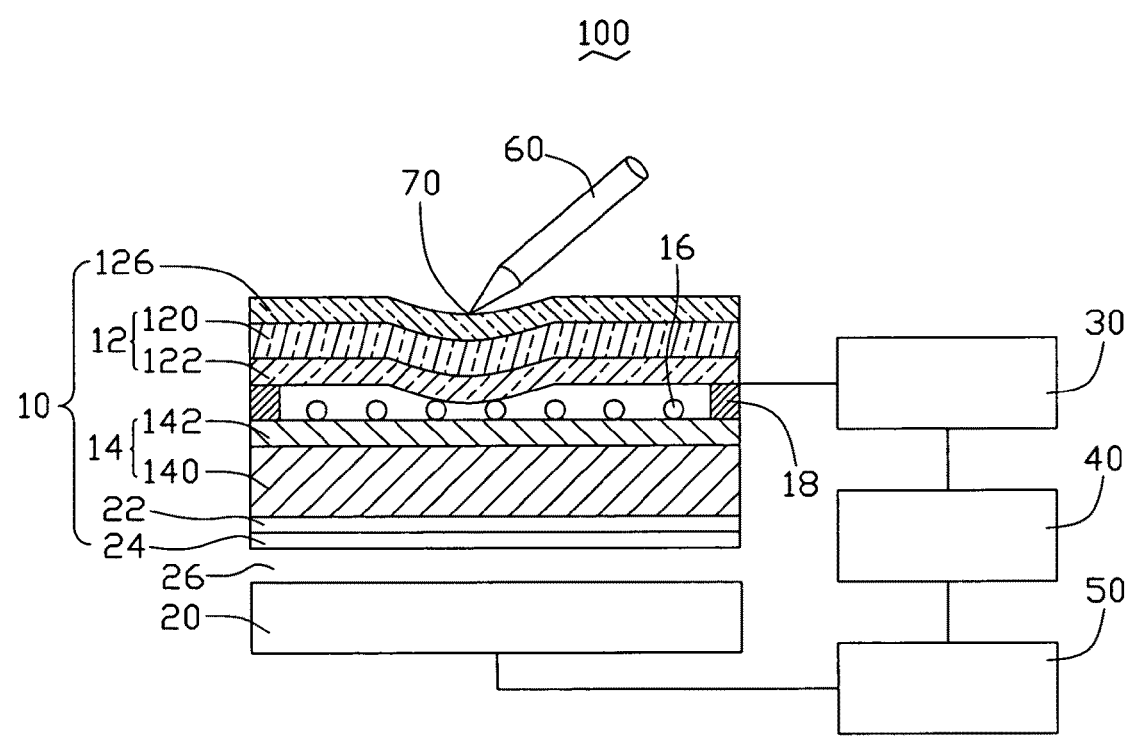
FIG. 7 is essentially a cross-sectional view of the touch panel of the exemplary embodiment used with a display element of a display device.

Referring also to FIG. 7, the touch panel 10 can further include a shielding layer 22 located on the lower surface of the second substrate 140. The material of the shielding layer 22 can be selected from indium tin oxide, antimony tin oxide, carbon nanotube film, and any other suitable electrically conductive material. In the present embodiment, the shielding layer is a carbon nanotube film. The carbon nanotube film includes a plurality of carbon nanotubes, and the orientations of the carbon nanotubes can be set as desired. The carbon nanotubes in the carbon nanotube film of the shielding layer 22 are arranged along a same direction. The carbon nanotube film is connected to ground and thus enables the touch panel 10 to operate without interference (e.g., electromagnetic interference).

Figure 3:
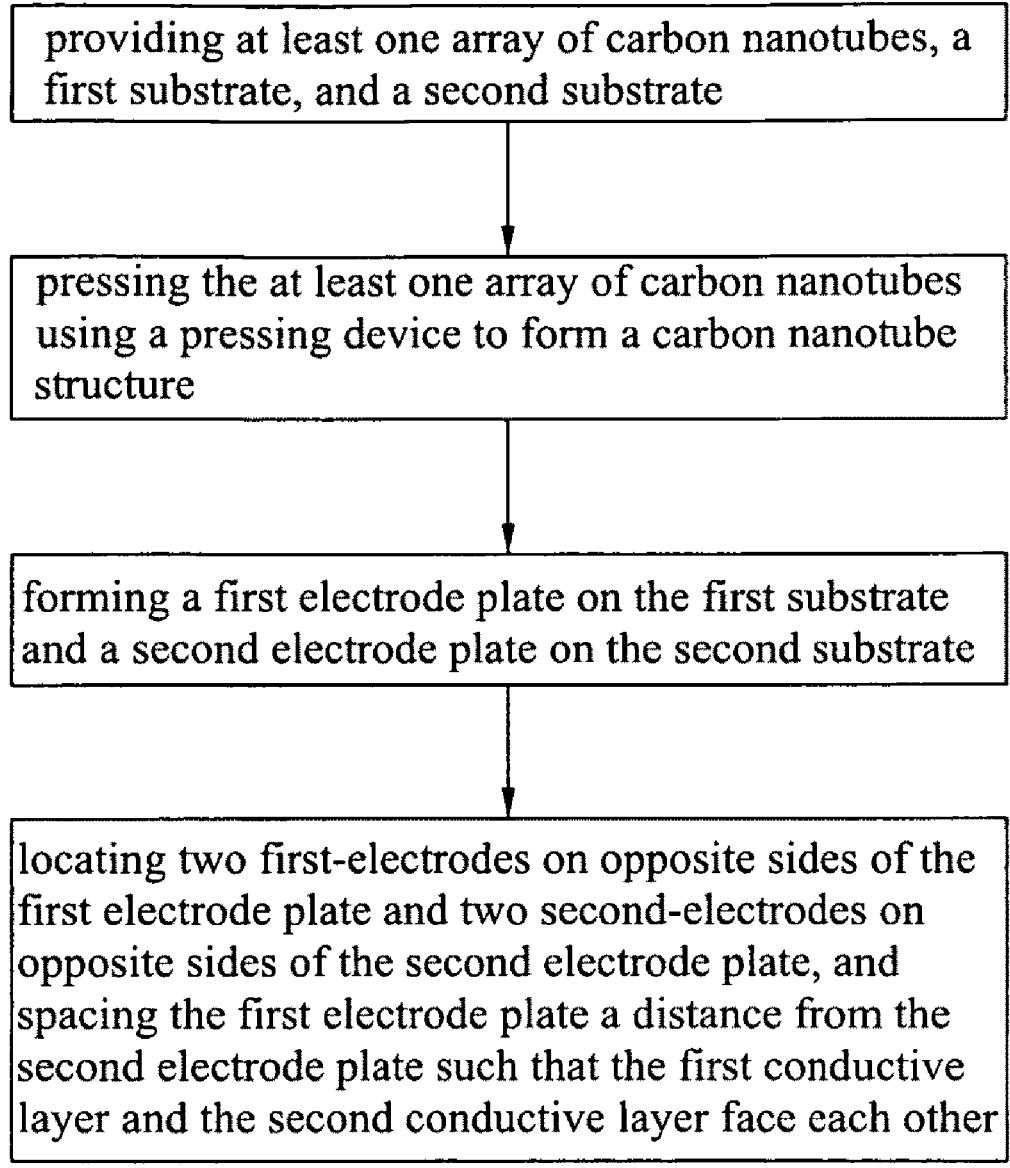
FIG. 3 is a flow chart of an exemplary method for making the touch panel of the exemplary embodiment.

Referring also to FIG. 3, an exemplary method for making the touch panel 10 includes the steps of: (a) providing at least one array of carbon nanotubes, a first substrate, and a second substrate; (b) pressing the array of carbon nanotubes with a pressing device to form a carbon nanotube structure on the first and second substrates, thereby forming a first conductive layer and a second conductive layer on the first and second substrates respectively; and (c) locating two first-electrodes on opposite short ends of the first electrode plate and two second-electrodes on opposite long sides of the second electrode plate, and spacing the first electrode plate a distance from the second electrode plate such that the first conductive layer and the second conductive layer face each other, thereby forming the touch panel 10.

In step (a), the array of carbon nanotubes is a super-aligned array of carbon nanotubes. The super-aligned array of carbon nanotubes can be formed by the substeps of: (a1) providing a substantially flat and smooth growing substrate; (a2) forming a catalyst layer on the growing substrate; (a3) annealing the growing substrate with the catalyst layer in air at a temperature in an approximate range from 700° C. to 900° C. for about 30 to 90 minutes; (a4) heating the growing substrate with the catalyst layer to a temperature in an approximate range from 500° C. to 740° C. in a furnace with a protective gas therein; and (a5) supplying a carbon source gas to the furnace for about 5 to 30 minutes and growing the super-aligned array of carbon nanotubes on the growing substrate.

In step (a1), the growing substrate can be a P-type silicon wafer, an N-type silicon wafer, or a silicon wafer with a film of silicon dioxide thereon. Preferably, a 4-inch P-type silicon wafer is used as the growing substrate.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height of about 50 microns to 5 millimeters. The super-aligned array of carbon nanotubes includes a plurality of carbon nanotubes parallel to each other and approximately perpendicular to the growing substrate. The carbon nanotubes in the super-aligned array can be selected from a group consisting of single-walled carbon nanotubes, double-walled carbon nanotubes, and multi-walled carbon nanotubes. Diameters of the single-walled carbon nanotubes are in an approximate range from 0.5 nanometers to 50 nanometers. Diameters of the double-walled carbon nanotubes are in an approximate range from 1 nanometer to 50 nanometers. Diameters of the multi-walled carbon nanotubes are in an approximate range from 1.5 nanometers to 50 nanometers.

The super-aligned array of carbon nanotubes formed under the above conditions is essentially free of impurities such as carbonaceous or residual catalyst particles. The carbon nanotubes in the super-aligned array are closely packed together by van der Waals attractive force therebetween.

In step (b), the carbon nanotube array is adherent in nature, and therefore the first substrate and the second substrate can be firmly adhered to the array of carbon nanotubes. In the present embodiment, the first conductive layer and the second conductive layer can be formed by either of two methods. Referring to FIG. 4, the first method includes the steps of: (b1) providing a pressing device, and pressing the array of carbon nanotubes to form a carbon nanotube film; (b2) cutting the carbon nanotube film into sizes of the first substrate and the second substrate; and (b3) adhering the cut carbon nanotube films on the first substrate and the second substrate respectively to form the first conductive layer and the second conductive layer. The second method includes the steps of: (b1') placing first surfaces of the first substrate and the second substrate on the array of carbon nanotubes; (b2') providing a pressing device, and pressing opposite second surfaces of the first substrate and the second substrate so that the first substrate and the second substrate are pressed onto the array of carbon nanotubes to form a carbon nanotube film on each of the first substrate and the second substrate; and (b3') cutting away excess carbon nanotube film to form the first conductive layer on the first substrate and the second conductive layer on the second substrate.

In step (b), a certain pressure can be applied to the array of carbon nanotubes by the pressing device. In the process of pressing, the carbon nanotubes in the array of carbon nanotubes form each of the carbon nanotube films under pressure. The carbon nanotubes in each carbon nanotube film are nearly all parallel to a surface of the carbon nanotube film. In step (b1), in the process of pressing, the carbon nanotubes slant, thereby forming a carbon nanotube film having a free-standing structure on the substrate on which the carbon nanotube array is initially formed. The carbon nanotubes in the free-standing structure are nearly all parallel to a major surface of the carbon nanotube film, and are arranged isotropically, or arranged along a same direction or arranged along a different directions. In step (b2'), the carbon nanotube film, under a certain pressure, separates from the growing substrate on which the carbon nanotube array is initially formed, and is adhered on the first substrate and the second substrate respectively because of the adhesive properties of the carbon nanotubes.

Figure 5:
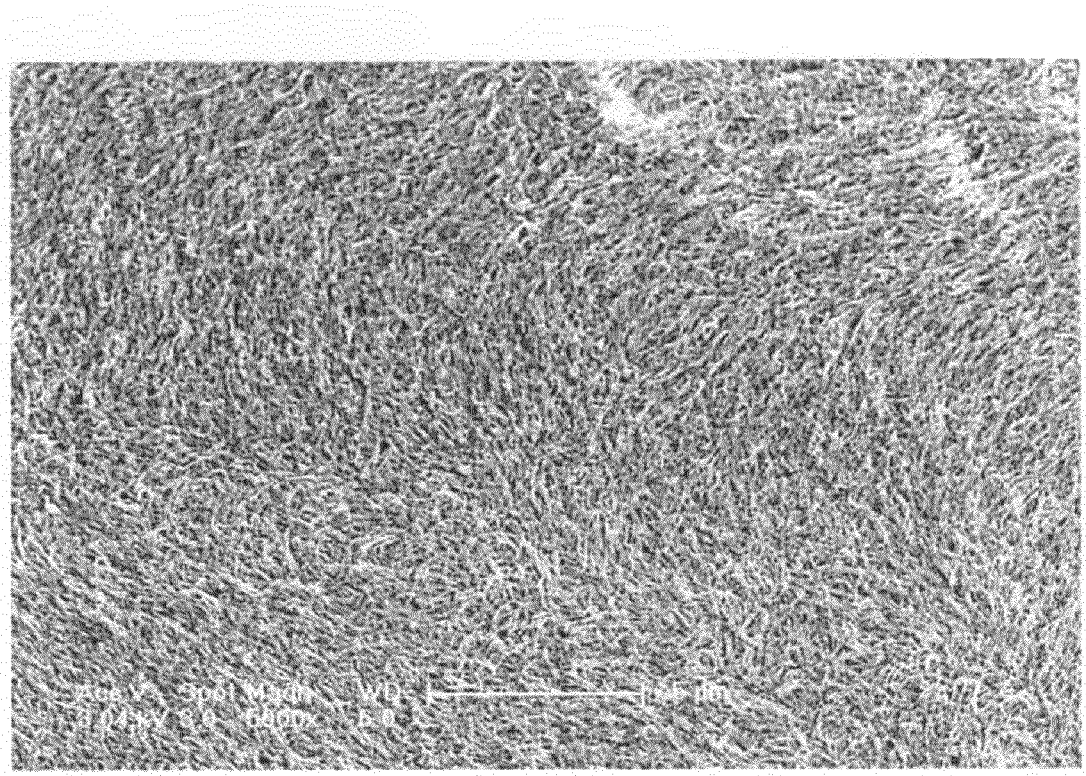
FIG. 5 shows a Scanning Electron Microscope (SEM) image of an isotropic carbon nanotube film that can be utilized in the touch panel of the exemplary embodiment.
Figure 6:
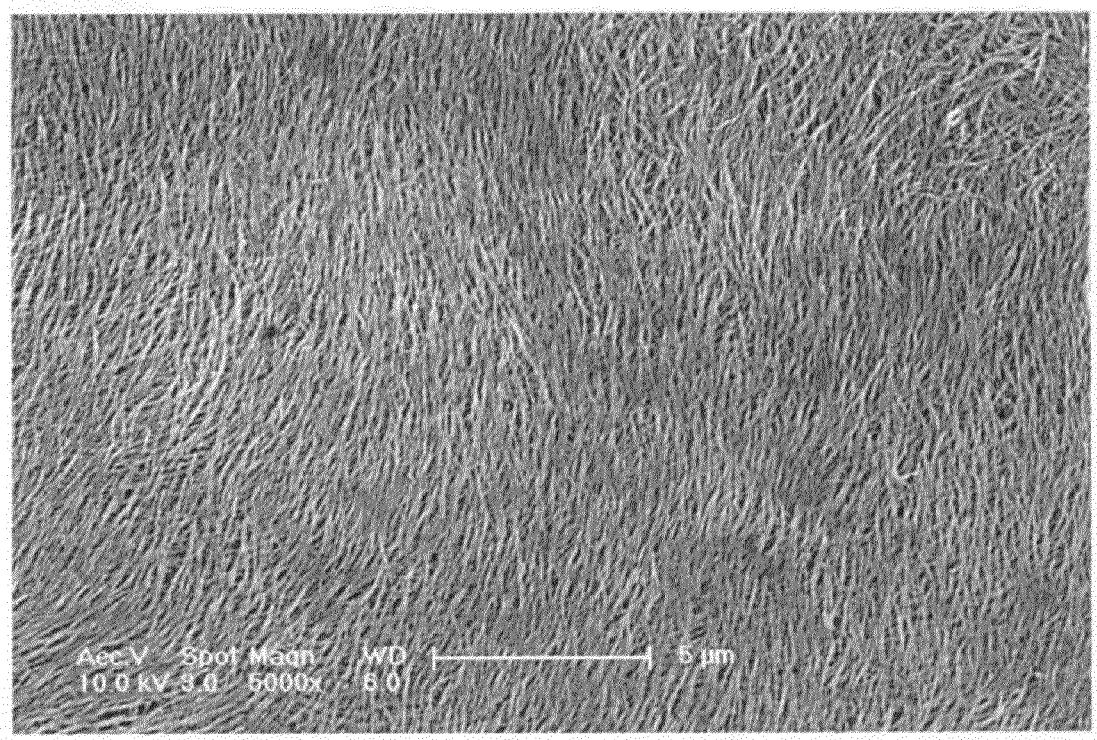
FIG. 6 shows an SEM image of another carbon nanotube film that can be utilized in the touch panel of the exemplary embodiment, with the carbon nanotubes in the carbon nanotube film being arranged in a preferred orientation.

In the present embodiment, the pressing device can be a pressure head. The pressure head has a smooth surface. It is to be understood that the shape of the pressure head and the pressing direction can, opportunely, determine the direction of the carbon nanotubes arranged in each carbon nanotube film. Specifically, referring to FIG. 5, when a planar pressure head is used to press the array of carbon nanotubes along a direction perpendicular to the applicable substrate, a carbon nanotube film having a plurality of carbon nanotubes isotropically arranged can be obtained. Referring to FIG. 6, when a roller-shaped pressure head is used to travel across and press the array of carbon nanotubes along a predetermined single direction, a carbon nanotube film having a plurality of carbon nanotubes aligned along a general direction is obtained. When a roller-shaped pressure head is used to travel across and press the array of carbon nanotubes along different directions, a carbon nanotube film having a plurality of carbon nanotubes aligned along corresponding different directions is obtained.

In the process of pressing, the carbon nanotubes will bend/fall over, thereby forming a carbon nanotube film having a free-standing structure with slanted carbon nanotubes. The carbon nanotubes in the free-standing structure are nearly all parallel to a surface of the carbon nanotube film, and are isotropically arranged, arranged along a same direction, or arranged along different directions.

In the present embodiment, each carbon nanotube structure includes a single carbon nanotube film. Each carbon nanotube film includes a plurality of carbon nanotubes arranged along a same direction, the direction being substantially the same as the traveling and pressing direction. It is to be understood that a degree of the slant of the carbon nanotubes in the carbon nanotube film relative to the vertical is proportional to the pressure applied. The greater the pressure, the greater the degree of slant. An angle $\alpha$ between the alignment directions of the carbon nanotubes in the carbon nanotube film and the major surface of the carbon nanotube film is in an approximate range from 0° to 15°. The angle $\alpha$ influences the conductive property of the carbon nanotube film. The smaller the angle $\alpha$, the better the conductive property of the carbon nanotube film. It can be understood that the angle $\alpha$ relates to the conductive property of the carbon nanotube film. Therefore in one quite suitable embodiment, the carbon nanotubes in the carbon nanotube film are substantially parallel to the surface of the carbon nanotube film. A thickness of the carbon nanotube film is opportunely determined by the height of the carbon nanotube array and the pressure applied. That is, the greater the height of the carbon nanotube array and/or the less the pressure, the greater the thickness of the carbon nanotube film.

In an alternative embodiment of step (b1'), it can be understood that first surfaces of the first substrate and the second substrate can be placed on two arrays of carbon nanotubes respectively.

In an alternative embodiment of each of the carbon nanotube layers, the carbon nanotube structure can include at least two stacked carbon nanotube films. For example, when the carbon nanotube structure includes two stacked carbon nanotube films, a method for forming such carbon nanotube structure can be as follows. Firstly, the first carbon nanotube film is made according to either of the methods described above. Thereby, a carbon nanotube film adhered (formed) on each of the first substrate and the second substrate is obtained. Then the first substrate and the second substrate each with the carbon nanotube film formed thereon is inverted and placed on a carbon nanotube array in much the same way as described in steps (b1') above. After that, the equivalent of steps (b2') and (b3') as described above are performed. Thereby, a two-layer carbon nanotube film structure on each of the first and second substrates is formed. The two adjacent carbon nanotube films in each such film structure are combined together by van der Waals attractive force.

The width of each carbon nanotube film depends on a size of the carbon nanotube array. The length of the carbon nanotube film can be arbitrarily set as desired. In one useful embodiment, when the growing substrate is a 4-inch P-type wafer as in the present embodiment, the width of the carbon nanotube film is in an approximate range from 0.5 nanometers to 10 centimeters, and the thickness of the carbon nanotube film is in an approximate range from 0.5 nanometers to 100 micrometers. The carbon nanotubes in the carbon nanotube film can be selected from a group consisting of single-walled carbon nanotubes, double-walled carbon nanotubes, and multi-walled carbon nanotubes. Diameters of the single-walled carbon nanotube are in an approximate range from 0.5 nanometers to 50 nanometers. Diameters of the double-walled carbon nanotubes are in an approximate range from 1 nanometer to 50 nanometers. Diameters of the multi-walled carbon nanotubes are in an approximate range from 1.5 nanometers to 50 nanometers.

In step (c), the first-electrodes 124 and the second-electrodes 144 are made of conductive silver paste. An exemplary method for making the first-electrodes 124 and the second-electrodes 144 includes the following steps: (c1) coating the conductive silver paste on opposite short ends of the first conductive layer 122 of the first electrode plate 12 and on opposite long sides of the second conductive layer 142 of the second electrode plate 14 via a screen printing method or a spraying method; and (c2) baking the first electrode plate 12 and the second electrode plate 14 in an oven for 10-60 minutes at a temperature in an approximate range from 100° C. to 120° C. to solidify the conductive silver paste, thus obtaining the first-electrodes 124 and the second-electrodes 144. Each of the first-electrodes 124 is oriented along the second direction, and each of the second-electrodes 144 is oriented along the first direction, with the first direction being perpendicular to the second direction.

The insulative frame 18 can, beneficially, be made of insulative resin or any other suitable insulative material (e.g., insulative binding agent). In the present embodiment, the material of the insulative frame 18 is insulative binding agent. The insulative binding agent can be coated on the edges of the upper surface of the second electrode plate 14 and/or on the edges of the lower surface of the first electrode plate 12. The insulative binding agent bonds the first and second electrode plates 12, 14 together.

The material of the transparent protective film 126 can be selected from a group consisting of silicon nitride, silicon dioxide, benzocyclobutene, polyester film, and polyethylene terephthalate. In the present embodiment, the transparent protective film is, beneficially, adhesive polyethylene terephthalate film. The adhesive polyethylene terephthalate film can be adhered to the upper surface of the first substrate 120, thereby serving as the transparent protective film 126.

Referring also to FIG. 7, a display device 100 includes the touch panel 10, a display element 20, a first controller 30, a central processing unit (CPU) 40, and a second controller 50. The touch panel 10 is opposite and adjacent to the display element 20, and is connected to the first controller 30 by an external circuit. The touch panel 10 can be positioned at a distance from the display element 20, or can be installed directly on the display element 20. The first controller 30, the CPU 40, and the second controller 50 are electrically connected. The CPU 40 is connected to the second controller 50 to control the display element 20.

The display element 20 can be, e.g., a liquid crystal display, a field emission display, a plasma display, an electroluminescent display, a vacuum fluorescent display, a cathode ray tube, or another display device.

When the shielding layer 22 is located on the lower surface of the second substrate 140, a passivation layer 24 is, beneficially, located on a lower surface of the shielding layer 22 that faces away from the second substrate 140. The material of the passivation layer 24 can, for example, be silicon nitride or silicon dioxide. The passivation layer 24 can be spaced a certain distance from the display element 20, or can be installed directly on the display element 20. In the illustrated embodiment, the passivation layer 24 is spaced a certain distance from the display element 20, thereby defining a gap 26. The passivation layer 24 can protect the shielding layer 22 from being damaged by excessive external force.

In operation, a voltage of 5V (volts) is applied to the two first-electrodes 124 of the first electrode plate 12 and the two second-electrodes 144 of the second electrode plate 14, respectively. A user operates the display device 100 by pressing the transparent protective film 126 of the touch panel 10 with a finger, a pen 60, or the like while visually observing the display element 20 through the touch panel 10. The pressing causes a deformation 70 of the first electrode plate 12. The deformation 70 establishes a connection between the first conductive layer 122 and the second conductive layer 142. Changes in voltages along the first direction of the first conductive layer 122 and along the second direction of the second conductive layer 142 can be detected by the first controller 30. Then the first controller 30 transforms the changes in voltages into coordinates of the pressing point, and sends the coordinates to CPU 40. The CPU 40 then sends out commands according to the coordinates to control the display of the display element 20.

The properties of the carbon nanotubes provide each of the carbon nanotube films of the carbon nanotube layers with superior toughness, high mechanical strength, and uniform conductivity. Thus the touch panel 10 and the display device 100 adopting the carbon nanotube layers are durable and highly conductive. Furthermore, the carbon nanotubes have excellent electrical conductivity; and each of the carbon nanotube layers is formed with a plurality of carbon nanotubes arranged isotropically, arranged along a same direction or arranged along different directions. In either case, the carbon nanotube structure has a uniform resistance distribution and high electrical conductivity, thus providing the touch panel 10 and the display device 100 with improved sensitivity and accuracy. Moreover, the method for making the carbon nanotube films via pressing the carbon nanotube array using a pressing device is simple, without the need for a vacuum or heating processes. Accordingly, the touch panel 10 and the display device 100 can be manufactured inexpensively.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that the above description and the claims drawn to a method may include some indication in reference to certain steps. However, the indication used is only to be viewed for identification purposes and not as a suggestion as to an order for the steps.

What is claimed is:

1. A touch panel comprising:
    a first electrode plate comprising a first substrate and a first conductive layer located on a lower surface of the first substrate; and
    a second electrode plate separated from the first electrode plate and comprising a second substrate and a second conductive layer located on an upper surface of the second substrate;
    wherein at least one of the first conductive layer and the second conductive layer comprises a carbon nanotube structure comprised of carbon nanotubes, the carbon nanotubes in the carbon nanotube structure are arranged isotropically, arranged along a same direction or arranged along different directions, an angle between a primary alignment direction of the carbon nanotubes in the carbon nanotube structure and a surface of the carbon nanotube structure in contact with the first substrate or the second substrate is greater than 0° and smaller than 15°.

2. The touch panel as claimed in claim 1, wherein groups of the carbon nanotubes in the carbon nanotube structure are joined end to end by van der Waals attractive force between the ends.

3. The touch panel as claimed in claim 1, wherein a thickness of the carbon nanotube structure is in an approximate range from 0.5 nanometers to 100 micrometers.

4. The touch panel as claimed in claim 1, wherein the carbon nanotubes in the carbon nanotube structure are selected from the group consisting of single-walled carbon nanotubes, double-walled carbon nanotubes, and multi-walled carbon nanotubes, diameters of the single-walled carbon nanotubes are in an approximate range from 0.5 nanometers to 50 nanometers, diameters of the double-walled carbon nanotubes are in an approximate range from 1 nanometer to 50 nanometers, and diameters of the multi-walled carbon nanotubes are in an approximate range from 1.5 nanometers to 50 nanometers.

5. The touch panel as claimed in claim 1, wherein the first electrode plate further comprises two first-electrodes located on the first conductive layer, each of the first-electrodes is oriented parallel to a second direction and electrically connected to the first conductive layer.

6. The touch panel as claimed in claim 5, wherein the second electrode plate further comprises two second-electrodes located on the second conductive layer, each of the second-electrodes is oriented parallel to a first direction and electrically connected to the second conductive layer.

7. The touch panel as claimed in claim 6, wherein the first direction is substantially perpendicular to the second direction.

8. The touch panel as claimed in claim 1, further comprising an insulative frame located between the second electrode plate and the first electrode plate.

9. The touch panel as claimed in claim 8, wherein a plurality of dot spacers are located between the first conductive layer and the second conductive layer.

10. The touch panel as claimed in claim 1, further comprising a shielding layer located on a lower surface of the second substrate of the second electrode plate, wherein a material of the shielding layer is selected from the group consisting of indium tin oxides, antimony tin oxides, and carbon nanotube films.

11. The touch panel as claimed in claim 1, further comprising a transparent protective film located on an upper surface of the first electrode plate, wherein a material of the transparent protective film is selected from the group consisting of silicon nitrides, silicon dioxides, benzocyclobutenes, polyester films, and polyethylene terephthalates.

12. A display device comprising:
a touch panel comprising:
a first electrode plate comprising a first substrate and a first conductive layer located on a lower surface of the first substrate; and
a second electrode plate separated from the first electrode plate and comprising a second substrate and a second conductive layer located on an upper surface of the second substrate;
wherein at least one of the first conductive layer and the second conductive layer consists of a carbon nanotube structure consisting of carbon nanotubes, the carbon nanotubes in the carbon nanotube structure are arranged isotropically, arranged along a same direction, or arranged along different directions; and
a display element opposite and adjacent to the touch panel.

13. The display device as claimed in claim 12, further comprising a first controller, a central processing unit, and a second controller; the display element is connected to the first controller, and the central processing unit is connected to the second controller.

14. The display device as claimed in claim 12, wherein the touch panel is spaced from the display element with a distance.

15. The display device as claimed in claim 12, wherein the touch panel is located on the display element.

16. The display device as claimed in claim 12, further comprising a passivation layer located on a surface of the touch panel, and a material of the passivation layer being selected from the group consisting of silicon nitride and silicon dioxide.

17. The display device as claimed in claim 12, wherein the carbon nanotubes in the carbon nanotube structure are substantially parallel to a surface of the carbon nanotube structure in contact with the first substrate or the second substrate.

18. The display device as claimed in claim 12, wherein an angle between a primary alignment direction of the carbon nanotubes in the carbon nanotube structure and a surface of the carbon nanotube structure in contact with the first substrate or the second substrate is in a range from about 0° to about 15°.

* * * * *